Feb. 26, 1963 R. G. DONNELLY ETAL 3,079,251
BRAZING ALLOYS
Filed July 25, 1960
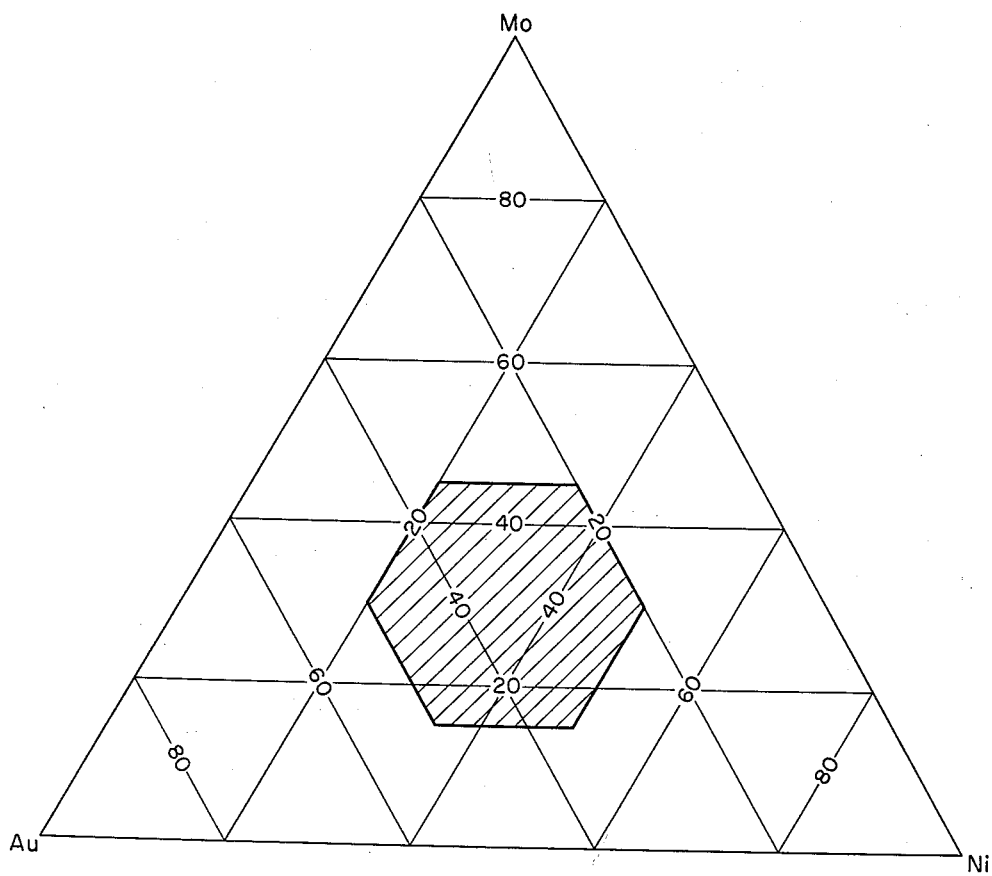
INVENTORS.
Ralph G. Donnelly
BY Ralph G. Gilliland
Gerald M. Slaughter
Roland G. Anderson
ATTORNEY

3,079,251
BRAZING ALLOYS

Ralph G. Donnelly, Oak Ridge, Ralph G. Gilliland, Knoxville, and Gerald M. Slaughter, Oak Ridge, Tenn., assignors to the United States of America as represented by the United States Atomic Energy Commission
Filed July 25, 1960, Ser. No. 45,251
3 Claims. (Cl. 75—134)

The present invention relates generally to a new class of brazing alloys and to a method of brazing graphite parts to corrosion resistant refractory metals using said brazing alloys to form an improved corrosion resistant joint having useful strength at high temperatures. The invention is further directed to the use of said alloys in forming graphite-to-graphite brazed points of the character described.

Graphite is useful as a material of construction in many high temperature applications such as jet engine parts. It is particularly useful in many areas of nuclear technology because of its excellent moderator and reflector qualities which are combined uniquely with high temperature structural strength and stability and corrosion resistance. The state of the art of graphite technology has now developed to a point where graphite can be machined to about the same degree of precision obtained with machineable metals. For example, internal passages and other intricate geometric forms and shapes that can be made in metals can be duplicated by preforming graphite into several components through the use of die-sinking or pattern-making techniques or by using a profile milling machine. In order to form a desired integral assembly where at least a portion of said assembly is comprised of graphite parts, the formation of reliable graphite-to-graphite and graphite-to-metal joints is required. It is therefore obvious that the full utilization of graphite as a structural material depends to a large extent upon the development of suitable techniques for joining graphite components and graphite containing assemblies.

It is an object of the present invention to provide a novel method of brazing graphite parts such that the resultant brazed joint has sufficient strength and corrosion resistance at least substantially equal to the graphite to be joined, at elevated temperatures up to about 800° C.

The provision of such an improved joint constitutes a further object of this invention.

A still further object of this invention resides in providing a new class of brazing alloys.

Other objects and advantages will be apparent from the ensuing description taken in conjunction with the accompanying FIGURE in which the cross-hatched area thereof defines the class of alloys (in weight percentages) useful in the brazing method to be described.

We have found that graphite-to-graphite and graphite-to-metal parts can be brazed together with the class of herein defined gold-nickel-molybdenum alloys by the method herein to be described to produce a corrosion resistant brazed joint whose strength is at least equal to that of the graphite portion of the joint. As used here, the term "corrosion resistance" refers to the corrosion resistance of said brazing alloys to fused fluoride salt compositions. More particularly a brazing alloy is deemed corrosion resistant if, upon immersion for 100 hours in a molten fluoride composition consisting of a eutectic mixture of LiF and BeF$_2$, it undergoes a loss in weight of less than about 0.1%.

The brazing alloys within the scope of this invention contain as essential ingredients 20 to 50 percent by weight of gold, 20 to 50 percent by weight of nickel, and 15 to 45 percent by weight of molybdenum, the composition of said alloy system being defined within the hatched area of the accompanying figure. Although the strength and corrosion resistance of these alloys are derived from all three constituents, the presence of molybdenum also serves as an excellent wetting agent since it readily forms carbides when molten and in contact with the graphite. We have found that the concentration of molybdenum in the alloy is critical in that alloys having a molybdenum concentration greater than 45 percent by weight render the resulting alloy too hard and brittle to form a joint of useful strength. Alloys containing from 15 to 45 percent by weight molybdenum, when molten, will wet and flow smoothly on the surfaces to be joined. When solidified, such alloys form joints at least as strong as the graphite portion of the brazed joint.

We have found that the wettability and flowability requirements for forming a satisfactory graphite-to-graphite braze are somewhat higher than that necessary for forming brazed joints between graphite and refractory metals. Hence, a specific and preferred embodiment of our invention resides in the use of a gold-nickel-molybdenum brazing alloy containing from 30 to 40 percent by weight molybdenum. The gold and nickel components have relatively little effect on the wetting and flow characteristics of the alloys comprising this invention, although the melting point of these alloys has been found to vary with the nickel content. For example, in comparing a 40% gold—20% nickel—40% molybdenum alloy with a 20% gold—40% nickel—40% molybdenum alloy, the wetting and flow characteristics were found to be relatively the same, but the higher nickel content alloy was found to melt at a somewhat higher temperature.

In preparing a desired brazing alloy, the gold, nickel and molybdenum are charged, in weighed increments, into an arc melting furnace which may comprise, for example, a water-cooled copper crucible and a tungsten electrode. The charge is melted under an inert atmosphere such as argon or helium to prevent contamination of the melt. The resulting melt is then solidified into an ingot. These alloys can be comminuted into small chunks or to powder as desired. In its powder condition said alloy can be uniformly mixed with a binder such as nitrocellulose or an acrylic resin to form a paste, it being essential that the binder burn away leaving no ash to contaminate the brazed joint. In whatever form prepared, the braze material is placed about the surfaces to be joined. The furnace used should be capable of reaching a temperature of about 1400° C. For example, the joint and surrounding braze material may be heated by a radio frequency induction heater to above the liquidus of the brazing alloy and held at temperature until the melted alloy is observed to melt and flow freely over the surfaces to be joined. At this point the heating means is switched off and the melted alloy allowed to freeze to form the brazed joint.

The brazing alloys of this invention generally have a solidus and liquidus temperature lying within the range 1200° C. to 1400° C. If a gold-nickel-molybdenum alloy having a higher solidus and liquidus temperature is used, then corresponding higher brazing temperatures are necessary. The brazing operation should be conducted in vacuum or under an inert atmosphere such as helium or argon, thus eliminating the necessity of a brazing flux and reducing any contamination in the brazed joint.

Brazed joints made in accordance with this procedure and with the alloys within the scope of this invention have been found to wet and flow smoothly and in all cases tested have been found to form corrosion resistant graphite-to-graphite and graphite-to-metal joints wherein the joints produced are at least as strong as the graphite itself.

The following examples will illustrate our invention in further detail:

Example I

A number of fine-grained, extruded graphite tubes (⅞″ I.D., 1¼″ O.D.) were butt-brazed to a quarter-inch thick molybdenum header plate by preplacing a selected brazing alloy consisting essentially of 35 percent gold, 35 percent nickel and 30 percent molybdenum around the outside diameter of each tube in contact with the header plate. If necessary, a suitable fixture may be applied to hold the tubes in position in contact with the header plate. The header tube assembly was placed in a sealed chamber adapted to be heated by a radio frequency induction apparatus, with means provided to maintain an inert atmosphere (helium) within the chamber during actual brazing. The induction heater was then switched on until the brazing alloy was observed to melt and flow completely about each tube-to-header joint. The brazed parts were then cooled. Inspection of the joints showed a clean, continuous brazed fillet about the outside as well as the inside diameter of the tubing. This indicated that the molten brazing alloy had been drawn through the joint by capillary action to produce the brazed fillet along the inside diameter of the tubes.

Example II

A brazed assembly was formed in the same manner and with the same alloy as in Example I except that the header plate in this case consisted of a reactor grade graphite designated as AGOT graphite. The resulting brazed assembly, as in Example I, was found to have formed a continuous brazed fillet about the inside as well as the outside diameters of the graphite tubes in contact with the header plate.

The strength of the joints formed in the above examples was tested by applying force to the joint area and attempting to bend the joint members. In each case it was observed that the graphite cracked prior to any apparent weakening of the brazed joint.

Obviously, the invention is not limited to brazing parts of any configuration or shape nor is this invention limited to brazing parts of any particular refractory metal or alloy. However, the brazing alloys of this invention have been shown to be particularly suitable for braze bonding graphite parts together and braze bonding graphite parts to such refractory metals as, for example, molybdenum, tungsten, titanium, zirconium, tantalum, niobium, and rhenium, and alloys containing said metals as essential alloying ingredients. Joints made with the brazing alloys of this invention connecting parts made of these metals and alloys to graphite parts will be found to be at least substantially equal in strength to the graphite parts to be joined.

In forming the many possible brazed joints in accordance with this invention, consideration should be given to the proper matching of the coefficients of the expansion of the materials being brazed together. Wide differences between these coefficients may lead to considerable differential stress with subsequent weakening of the joint.

While we have described our invention in its present preferred embodiment, it will be obvious to those skilled in the art that various changes and modifications may be made without departing from the scope thereof as defined in the following claims.

What is claimed is:

1. A brazing allow which, in the molten state, is characterized by excellent wettability and flowability, said alloy being capable of forming a corrosion resistant brazed joint wherein at least one component of said joint is graphite and the other component is a corrosion resistant refractory metal, said alloy consisting essentially of 20 to 50 percent by weight of gold, 20 to 50 percent by weight of nickel, and 15 to 45 percent by weight of molybdenum.

2. A ternary alloy of particular utility in forming a brazed joint between graphite parts wherein the strength of said joint is at least equal to the high-temperature strength of the graphite to be joined, said alloy consisting essentially of 20 to 50 percent by weight of gold, 20 to 50 percent by weight of nickel, and 30 to 40 percent by weight of molybdenum.

3. A brazing alloy which, in the molten state, is characterized by excellent wettability and flowability, said alloy being capable of forming a corrosion resistant brazed joint wherein at least one component of said joint is graphite and the other component is a refractory metal selected from the group consisting of tungsten, molybdenum, tantalum, zirconium, titanium, and rhenium and alloys containing said metal as an essential alloying ingredient, said brazing alloy consisting essentially of 20 to 50 percent by weight of gold, 20 to 50 percent by weight of nickel, and 15 to 45 percent by weight of molybdenum.

References Cited in the file of this patent

UNITED STATES PATENTS 2,856,281     Cremer et al. _____ Oct. 14, 1958